United States Patent [19]

Cramer et al.

[11] Patent Number: 5,143,792
[45] Date of Patent: Sep. 1, 1992

[54] METHOD OF FORMING A FLITCH AND PRODUCING NOVEL SHEETS OF VENEER

[76] Inventors: Lloyd Cramer, 5715 Pinehaven Dr., Greensboro, N.C. 27410; Stephen A. Cramer, 2703C Centennial, High Point, N.C. 27265

[21] Appl. No.: 754,139

[22] Filed: Sep. 3, 1991

[51] Int. Cl.⁵ .......................... B32B 9/00; B27D 1/00
[52] U.S. Cl. .................................. 428/528; 144/346; 144/348; 144/350; 144/352; 427/221; 427/372.2
[58] Field of Search ............... 427/221, 372.2, 384, 427/385.5, 386; 428/528, 270, 106; 144/3 R, 345, 348, 350, 352, 364, 380

[56] References Cited

U.S. PATENT DOCUMENTS

| | | | |
|---|---|---|---|
| 3,418,195 | 12/1968 | Allan | 144/352 |
| 3,969,558 | 7/1976 | Sadashige | 144/350 |
| 3,970,497 | 7/1976 | Glover et al. | 144/352 |
| 4,743,509 | 5/1988 | Kokrhanek | 144/348 |

FOREIGN PATENT DOCUMENTS 001893 1/1980 Japan ................... 144/350
118803 9/1980 Japan ................... 144/350

*Primary Examiner*—W. Donald Bray

[57] ABSTRACT

A method of forming a flitch and producing novel sheets of veneer which includes the steps of joining a plurality of veneer sheets in a face-to-face relationship, applying pressure to bond the sheets and form the flitch, coating the ends of the formed flitch to resist checking and splitting, heating the flitch in an oven and thereafter cooking the flitch in a water bath for a period of time sufficient to place it in condition for slicing. The flitch is then removed from the bath, cooled for a period of time, prepared for the slicing operation, and sliced into thin sheets of veneer which are passed through a dryer thus resulting in a new veneer sheet having a novel texture and surface pattern. This manufactured flitch when sliced vertically will yield veneer sheets having a quarter grain or striped pattern. Veneer of varying patterns can be obtained by placing a substantially circular rod longitudinally under the formed flitch to provide an upper exterior surface curvature. The flitch can be cut horizontally, vertically, and in between these two limits to provide a variety of patterns.

19 Claims, 3 Drawing Sheets

5,143,792

METHOD OF FORMING A FLITCH AND PRODUCING NOVEL SHEETS OF VENEER

BACKGROUND OF THE INVENTION

1. Field of the Invention

The present invention relates to the production of veneer and more particularly to a new and improved method for forming a flitch and sheets of veneer which sheets themselves are of a novel texture and pattern.

2. Description of the Prior Art

Veneer has been traditionally produced by preparing the trunks of various species of trees from which veneer is sought for a slicing operation so that thin sheets of veneer are produced that can later be made into articles of furniture, or decorative wall panelling. Preparation involves the shaping of the tree trunk to a desired configuration and size to form a flitch. The shaping is usually done by sawing longitudinally the trunk to give it a generally rectangular cross-sectional configuration.

After the flitch has been shaped, it is cooked in a vat of hot water for a period of time sufficient to condition it for the slicing operation. The cooking time varies, of course, according to the specie of wood from which the flitch is formed.

The cooking operation conditions the flitch for slicing so that it will not splinter or split during slicing. Veneer slicers come in many forms and traditionally work in a reciprocating the flitch vertically against the knife as the knife moves forward into the flitch.

The veneer sheets resulting from the slicing operation are, of course, soaked from the cooking process and are thereafter placed in dryers to remove the moisture and cure the wood.

The texture and pattern of the resulting veneer sheets can be varied to some extent by the way the flitch is positioned in the slicer. Varying the position will vary the pattern resulting in the veneer slice because of the grain of the flitch itself.

The furniture and the decorating industries continue to seek novel wood textures for case goods and wall preparations, and the present invention provides numerous novel veneer surfaces for both these industries.

The veneer for some woods such as, for example, maple, ash, cherry, birch, white oak, red oak, aspen, poplar, gum, pine and fir, are not aesthetically acceptable for some sliced veneer applications. By using novel process set forth herein, the non-descript grain patterns of these woods become beautiful and the veneer slices resulting therefrom become very useful and desirable.

SUMMARY OF THE INVENTION

The purpose of the present invention, which will be described subsequently in greater detail, is to provide a new and novel method for forming a flitch and sliced veneer sheets resulting therefrom which have all of the advantages of prior art methods and none of the disadvantages. To attain this purpose, an embodiment of the present invention is illustrated in part in the drawings.

The method involves the formation of a flitch by joining a plurality of veneer sheets in a face-to-face relationship which is substantially rectangular in crossection or, by the insertion of a substantially circular rod longitudinally under the flitch, provided with a curved upper surface to vary the pattern of veneer sheets resulting from the slicing operation. The formed flitch is coated at each of its ends to resist checking and splitting and thereafter heated in an oven. The flitch is then cooked in a water bath, removed and prepared for slicing, sliced into a plurality of veneer sheets which are then passed through a dryer. Because the slicing operation in the case of a formed flitch having a substantially rectangular cross-section will be vertical, the veneer sheet resulting from the slicing operation will be formed from a small thin edge of all of the veneer sheets making up the formed flitch. The texture of this resulting sheet is defect free, novel, and unique, and brings about an unusual and very attractive finish for whatever purpose the veneer is used.

If the formed flitch having an upper curved surfaces is sliced; slicing can be either horizontal or vertical depending upon the desired pattern. Further pattern variations may be obtained by changing the position of the formed flitch with respect to the slicer knife.

Obviously, the method in which veneers are cut is an important factor in producing various visual effects. The flitch made in accordance with the present inventive concept can be sliced subjected to many of the traditional techniques resulting in entirely different visual characteristics. For example, two logs of the same species, but with their veneers cut differently, will have entirely different visual characteristics. In veneer manufacturing, five principle methods of cutting are used. These include rotary cutting, flat slicing, quarter slicing, rift-cut, and half-round slicing. Several of these traditional techniques are available in the present inventive concept. Certainly flat slicing, quarter slicing, rift-cut, and half-round slicing are compatible with the flitch formed under the methods set forth herein.

Thus, there has been outlined, the more important features of the invention in order that the detailed description that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of the method and to the arrangement of the components set forth in the following description or illustrated in the drawings. The invention is capable of other embodiments and of being practiced and carried out in various ways.

It is also to be understood that the phraseology and terminology employed herein are for the purpose of description and should not be regarded as limited. As such, those skilled in the art will appreciate that the concept upon which this disclosure is based may readily be utilized as a basis for designing other structures, methods and systems in carrying out the several purposes of the present invention. It is important that the claims be regarded as including such equivalent methods and products resulting therefrom as they do not depart from the spirit and scope of the present invention. The application is neither intended to define the invention of the application, which is measured by its claims, nor to limit its scope in any way.

It is, therefore, an object of the present invention to provide a new and improved method for producing sheets of veneer which has all of the advantages of prior art methods and none of the disadvantages.

It is another object of present invention to provide a new and improved method for producing veneer which results in novel and unique veneer sheets.

It is a further object of the present invention to provide a novel method for producing patterned veneer that is capable of many more resulting surface patterns than prior art processes permit.

Yet still another object of the present invention is to provide sheets of veneer that are made from previously assembled sheets of perhaps less than first quality veneer, that are of higher quality a the result of the novel process used.

Another object of the present invention is to provide solid defect free lumber parts of various thicknesses having enhanced grain patterns.

These, together with other objects of the invention, along with the various features of novelty which characterize the invention, are noted with particularity in the claims annexed to and forming a part of this disclosure. For a better understanding of the invention, its operating advantages, and the specific results obtained by its uses, reference should be made to the following detailed specification taken in conjunction with the accompanying drawings in which like characters of reference designate like parts throughout the several views.

DETAILED DESCRIPTION OF THE DISCLOSURE

Figure 1:
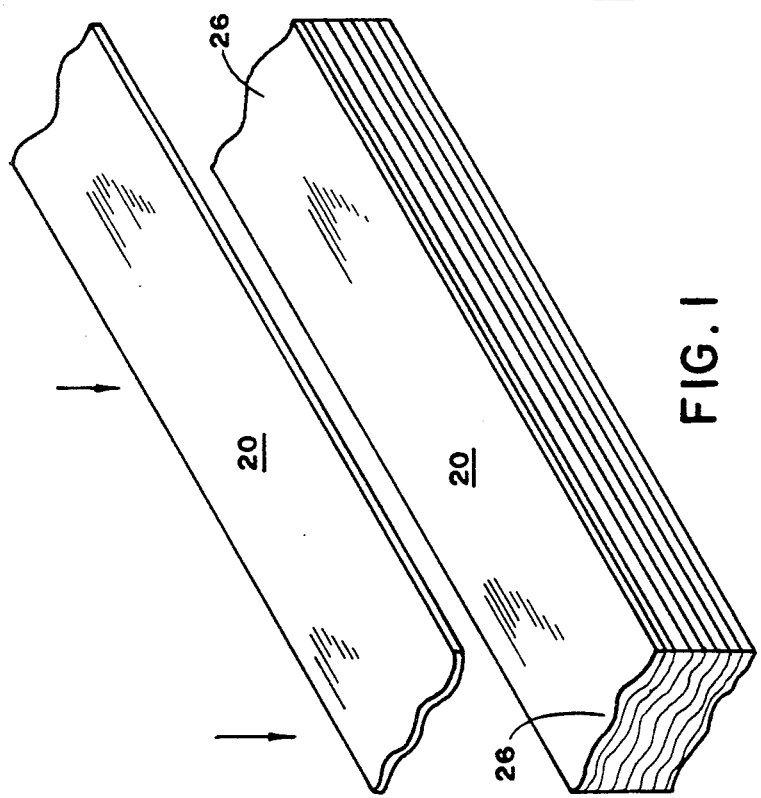
FIG. 1 is a perspective and slightly exploded view of a flitch being formed as a part of the present process wherein a plurality of veneer sheets are joined together in a face-to-face relationship.
Figure 3:
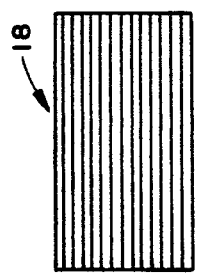
FIG. 3 is an end elevational view of the flitch of FIG. 1.
Figure 8:
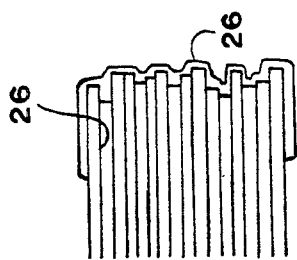
FIG. 8 is a side elevational, partial and enlarged view of on end of the flitch of FIG. 1 wherein that end has been coated to prevent checking and splitting.
Figure 7:
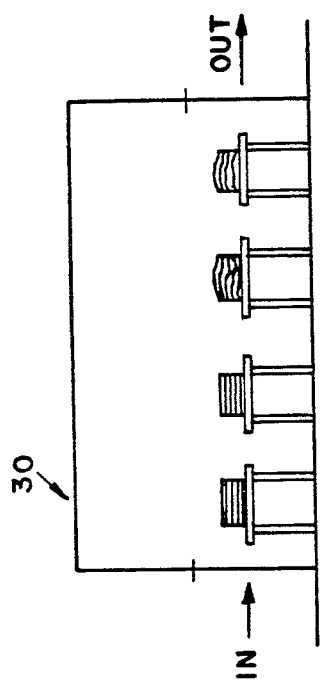
FIG. 7 is a side elevational and schematic view of an oven within which the formed flitches are positioned for drying and curing.

The novel method of the present invention involves the formation of a flitch, shown generally as 18, from a plurality of veneer sheets 20 joined together in a face-to-face relationship as shown in FIG. 1. Sheets 20 ar glued together with a specially prepared glue, for example, Type No. 1 PROBOND 3215 (Catalyst 8123, 5% Application). This glue is particularly effective in bonding the veneer sheets together so that the flitch 18 formed thereby resists separation even during the cooking step of the process.

Figure 5:
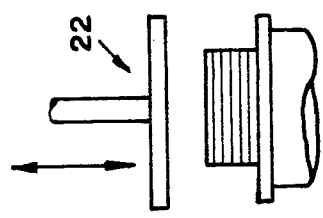
FIG. 5 is an end elevational and fragmentary view of a press used to join the plurality of veneer sheets to form the flitch of FIG. 1.

Once the sheets have been joined, the formed flitch 18 is subjected to a pressure by a press such as that shown as 22 in FIG. 5. The press exerts a pressure on the formed flitch 18 within the range of 140 to 160 pounds per square inch, depending upon the wood specie and veneer thickness involved, so that the gluing operation is thereby completed.

The ends 26 of the formed flitch 18 are then coated with a special plastic coating, an acceptable version of which is sold under the trademark Nelsonite. The coating envelopes the ends 26 of the formed flitch 18 to prevent checking and splitting of the sheets 20 of flitch 18. Coating 28, because of the special ingredients of the product used, will withstand the subsequent heating and cooking to which the formed flitch is subjected.

Flitch 18 is then heated in an oven shown generally as 30 at temperatures from between 120 degrees Fahrenheit to 200 degrees Fahrenheit for a period of depending upon the wood specie used, so that the glue will completely cure. After the heating step has been completed, the flitch 18 is held for a period of from seven to ten days to assure that the glue has been finally cured and that it is stable for subsequent treatments it will receive.

The formed flitch 18 is then placed in a water vat shown generally as 32 where it cooks for a period of from 24 through 36 hours, depending on the wood specie involved at temperatures ranging from 120 degrees Fahrenheit to 200 degrees Fahrenheit. Obviously, the temperature of the water bath is varied to effectively and efficiently deal with the specie of wood making up flitch 18.

Figure 10:
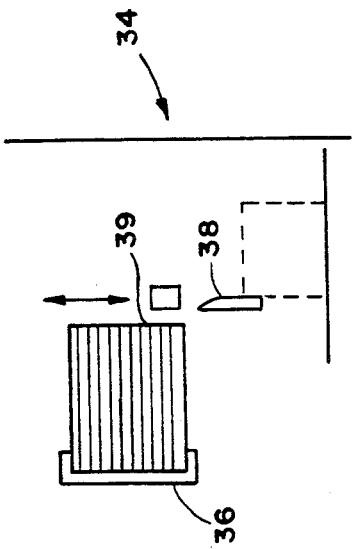
FIG. 10 is a side elevational and fragmentary view of a typical veneer slicer.
Figure 9:
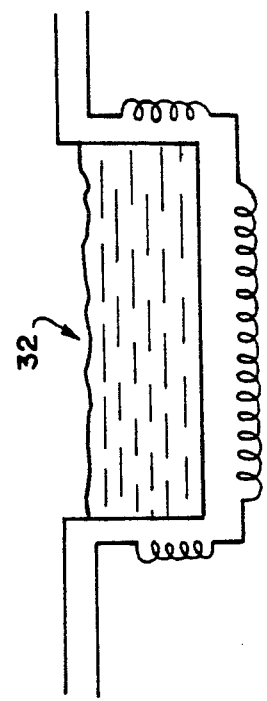
FIG. 9 is a side elevational and sectional view of a typical vat holding heated water within which the formed flitch is cooked for a predetermined period of time.
Figure 12:
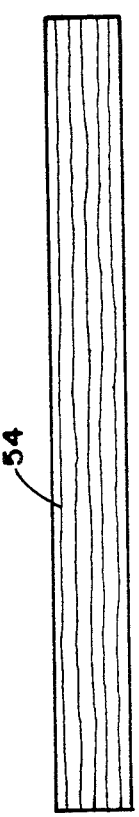
FIG. 12 is a plan view of a veneer sheet formed from the flitches of FIGS. 3 or 4 when the formed flitch is sliced vertically along its side.
Figure 14:
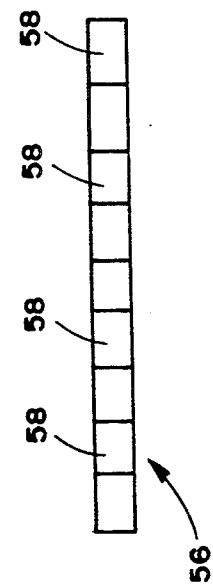
FIG. 14 is an end elevational view of a single veneer sheet sliced from the formed flitch.

After the cooking operation has been completed, the flitch is removed from vat 32 and sliced in a conventional manner on a slicer such as that shown generally as 34 in FIG. 10. During the slicing operation, the flitch is positioned on a holding mount 36 and is reciprocated vertically against a blade 38 to slice along one side 39 of the flitch surface. In FIG. 10, cutting is in a vertical direction (see arrow) to the formed flitch 18 cutting along its sides and forming sheets of veneer, shown generally as 56, made up of thin portions 58 of each veneer slice in formed flitch 18.

Figure 11:
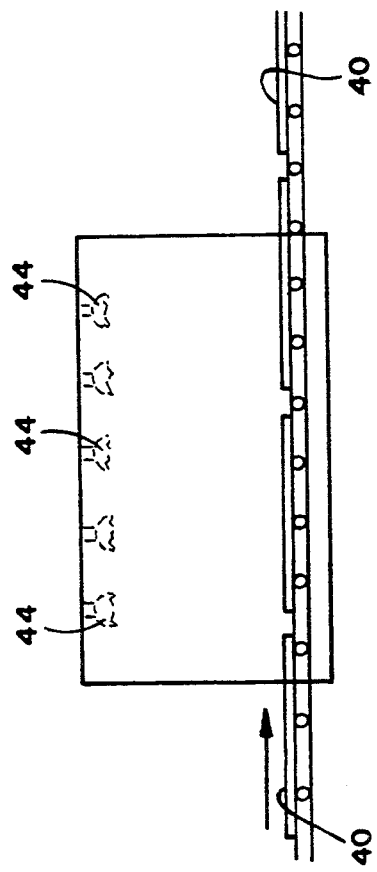
FIG. 11 is a side elevational and schematic view of a dryer through which individual sheets of sliced veneer obtained from the formed flitch are passed to dry.

When flitch 18 has been completely sliced, the individual slices 40,56 are moved through dryer 42 shown in FIG. 11 which contains various heating elements 44 that maintain the dryer temperature within a range of from 250 degrees Fahrenheit to 280 degrees Fahrenheit, again depending on the specie and other condition of the wood and the configuration of the formed flitch slices. When the sliced veneer is removed from the dryer, it can be made into veneer sections for articles of furniture or Wall panelling.

Because of the surface obtainable in the veneer created from the formed flitch, a very unique and novel pattern can be obtained. A significant feature in the formation of such patterns is that structurally sound but perhaps less than first quality veneer can be used in the formation of the flitch which will result in a higher quality veneer formed from the flitch 18 when it is substantially sliced. This provides the obvious advantage of being able to use lower grade veneer to obtain a higher grade product and brings about the attendant manufacturing an economic benefits associated therewith.

Figure 2:
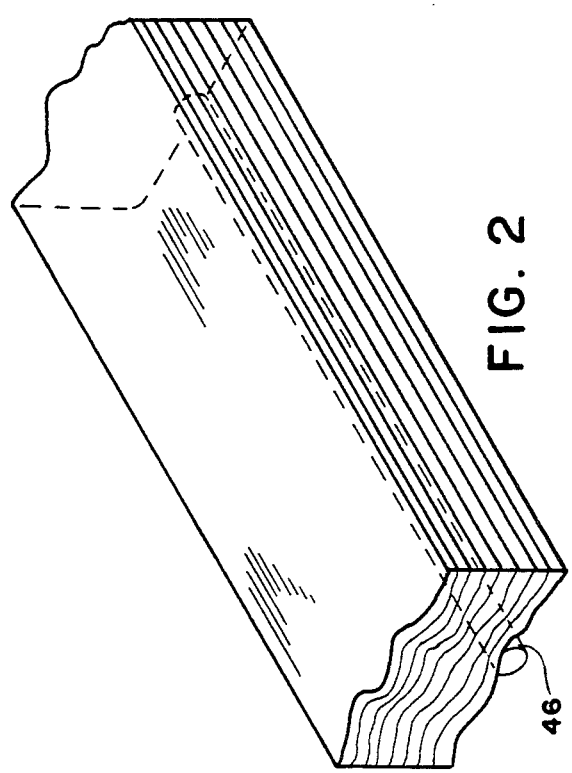
FIG. 2 is a perspective and partially hidden view of a variation of the formed flitch of FIG. 1 wherein an upper surface curvature is given to the formed flitch by positioning a substantially circular rod longitudinally under its mid portion.
Figure 6:
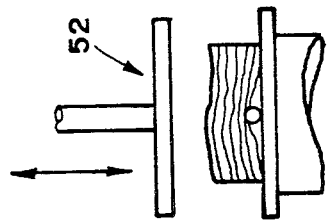
FIG. 6 is a side elevational and fragmentary view of the press of FIG. 5 used to form the flitch of FIG. 2.

The patterns obtainable from the formed flitch 18 are numerous in that the flitch can be positioned in several different ways (to change the angle of cut) on mount 36. Moreover, the alternative flitch embodiment shown in FIGS. 2 and 4 greatly increases the patterning opportunities available. The flitch formed in FIGS. 2 and 4 is created by utilizing a generally circular rod 46 that extends longitudinally under the approximate center of the flitch and thereby causes the formation of a curved upper surface 48 distinctly shown in FIG. 4 and again in FIG. 6. The previously described process is used to form the flitch of FIGS. 2 and 4.

Figure 4:
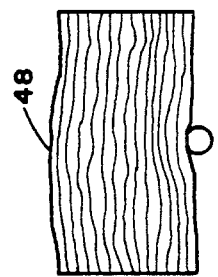
FIG. 4 is an end elevational view of the flitch of FIG. 2.
Figure 13:
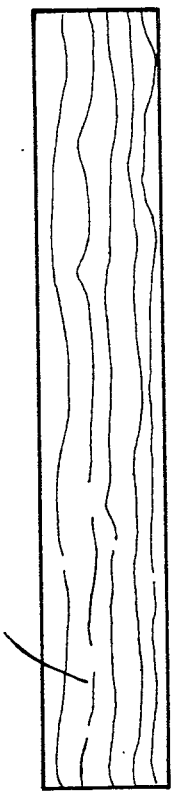
FIG. 13 is a veneer sheet formed from the flitch of FIG. 2 when the slicing operation is directed horizontally and substantially along the curved upper flitch surface.

The flitch embodiment shown in FIGS. 2 and 4 enable both vertical or side slicing as well as horizontal or top slicing to give numerous additional patterns. For example, side slicing the flitch of FIGS. 2 and 4 will result in a narrow grain striped pattern, while horizontally slicing the upper and lower surfaces 48,50 will result in veneer slices with cathedral patterns as shown in FIG. 13. Obviously, the slices formed from horizontal slicing can be varied by merely rotating the flitch slightly, moderately, or drastically to obtain a different pattern for each position. Different veneer patterns are also achievable by positioning rod 46 off center and either to the right side or left side of the flitch.

From this detailed description, it can be seen that a novel method for producing sheets of veneer and a unique veneer sheet resulting from utilizing that process have been provided that will meet the advantages of the prior art and offer additional advantages not offered by the prior art. Numerous veneer patterns are achievable by the construction of the flitch described in the novel process, and the flitch configuration can be varied by the use of other devices such as the rod to further enhance the patterning capacity. Moreover, the ability to use less than top grade veneer in the production of a higher quality veneer enhances the manufacturer's efficiency an profitability With respect to the present inventive concept, it is to be realized that the various operations forming a part of the novel method set forth herein and the components associated with the process including the individual steps embodied in the process are unlimited and are deemed readily apparent and obvious to one skilled in the art, and all equivalent relationships to those illustrated in the drawings and described in the specification are intended to be encompassed herein.

Therefore, the following is considered as illustrative only of the principles of the invention. Further, since numerous modifications and changes will readily occur to those skilled in the art, it is not desired to limit the invention to the exact construction and operation shown and described. All suitable modifications and equivalents that fall within the scope of the appended claims are deemed within the present inventive concept.

What is claimed is:

1. A method of forming a flitch from sheets of veneer comprising the steps of: joining a plurality of veneer sheets in a face-to-face relationship; applying pressure to bond the joined veneer sheets and form a flitch; coating the ends of the formed flitch to resist checking and splitting of the flitch; heating the flitch in an oven; cooking the flitch in a water bath; removing the flitch from the cooking water bath; preparing the flitch for slicing; slicing the formed flitch into a plurality of veneer sheets; and passing sliced sheets through a dryer.

2. The method of claim 1 wherein the joined veneer sheets are subjected to pressure within the range of 140 pounds per square inch to 160 pounds per square inch.

3. The method of claim 1 wherein the temperature of the oven is within the range of 120 degrees Fahrenheit to 200 degrees Fahrenheit.

4. The method of claim 1 wherein the water bath is heated to temperatures within the range from 120 degrees Fahrenheit to 200 degrees Fahrenheit.

5. The method as claimed in claim 1 wherein the dryer temperature is within the range of 250 degrees Fahrenheit to 280 degrees Fahrenheit.

6. The method as claimed in claim 1 wherein the flitch is cooked in the water bath from 24 to 36 hours.

7. The method of claim 2 wherein the temperature of the oven is within the range of 120 degrees Fahrenheit to 200 degrees Fahrenheit.

8. The method of claim 2 wherein the water bath is heated to temperatures of 120 degrees Fahrenheit to 200 degrees Fahrenheit.

9. The method of claim 2 wherein the dryer temperature is within the range of 250 degrees Fahrenheit to 280 degrees Fahrenheit.

10. The method of claim 2 wherein the flitch is cooked in the water bath from 24 to 36 hours.

11. The method of claim 7 wherein the water bath is heated to temperatures of from 120 degrees Fahrenheit to 200 degrees Fahrenheit.

12. The method of claim 11 wherein the dryer temperature is within the range of 250 degrees Fahrenheit to 280 degrees Fahrenheit.

13. The method of claim 12 wherein the flitch is cooked in the water bath from 24 to 36 hours.

14. The method of claim 1 wherein a substantially circular member is positioned proximate the face-to-face veneer sheets to provide exterior curvature to the formed flitch.

15. The method of claim 13 wherein a substantially circular member is positioned proximate the face-to-face veneer sheets to provide exterior curvature to the formed flitch.

16. A veneer sheet formed by the method of claim 1.

17. A veneer sheet formed by the method of claim 13.

18. A veneer sheet formed by the method of claim 14.

19. A veneer sheet formed by the method of claim 15.

* * * * *